3,192,271
METHOD FOR CONVERSION OF 1,2-DINITRO-
PARAFFINS TO 1-NITROOLEFINS
Giovanni A. Bonetti, Wilmington, Del., and Rudolph Rosenthal, Broomall, Pa., assignors to The Atlantic Refining Company, Philadelphia, Pa., a corporation of Pennsylvania
No Drawing. Filed Mar. 20, 1964, Ser. No. 353,599
15 Claims. (Cl. 260—644)

This invention relates to a method for the conversion of 1,2-dinitroparaffins to high yields of their corresponding 1-nitroolefins and, more particularly, it relates to the conversion of the 1,2-dinitroparaffins produced by the nitration of straight chain alpha-olefins when such dinitroparaffins are in admixture with other nitrogen-containing derivatives of the alpha-olefins.

It has long been known that nitrogen tetroxide or an equilibrium mixture of $NO_2$ and $N_2O_4$ may be added to an olefin to produce a mixture of the corresponding nitronitrites and dinitroparaffins. When this reaction is carried out in certain solvents and under controlled temperature conditions, by-product formation can be minimized such that the mixture of nitronitrite and dinitroparaffin is substantially the only product formed and with these compounds being in an approximately 1:1 weight ratio.

Heretofore a method has been proposed for converting the crude nitronitrite-dinitroparaffin mixture into nitroolefins by the use of ammonia or urea under anhydrous conditions. Subsequent investigators have reported, however, that if a straight chain alpha-olefin is nitrated to produce the corresponding nitronitrites and dinitroparaffins the resulting mixture of straight chain compounds cannot be converted to nitroolefins by the use of ammonia or urea except with substantial losses to various undesirable and useless by-products. It has also long been known that nitronitrites may be readily hydrolyzed either with a low molecular weight aliphatic alcohol or with water, and accordingly, the crude nitronitrite-dinitroparaffin mixture can be converted to a nitroalcohol-dinitroparaffin mixture by hydrolysis.

Pure dinitroparaffins may be converted at very high yields into their corresponding nitroolefins by processes which are also well-known, for example, the use of an aqueous slurry of an alkaline earth oxide such as calcium oxide. It was reported, however, that if dinitroparaffins, particularly the straight chain compounds produced by the nitration of straight chain alpha-olefins, were in admixture with other nitrogen-containing derivatives of alpha-olefins such as the nitronitrites or nitroalcohols, they could not be converted to their corresponding nitroolefins without considerable degradation of all the nitrogen-containing derivatives in the admixture and thus with the consequent loss of yield of desirable products. Therefore, prior art processes for the production of nitroolefins involved hydrolyzing the crude nitronitrite-dinitroparaffin mixture to produce the corresponding nitroalcohol-dinitroparaffin mixture, separating this mixture, for example, by means of silica gel chromatography, separately converting the nitroalcohols to nitroolefins by reaction with an alcoholic solution of an alkali metal hydroxide and converting the dinitroparaffins to nitroolefins by reaction with an aqueous slurry of a base such as calcium oxide.

It has now been found in accordance with this invention that the 1,2-dinitroparaffins produced by the nitration of straight chain alpha-olefins may be converted to high yields of their corresponding 1-nitroolefins without the formation of large amounts of undesired byproducts when the dinitroparaffins are in admixture with nitrogen-containing derivatives of the alpha-olefins provided certain critical reaction conditions are observed as will be described.

It is an object of this invention to provide a method for the conversion of 1,2-dinitroparaffins produced by the nitration of straight chain alpha-olefins to high yields of their corresponding 1-nitroolefins.

It is a further object of this invention to provide a method for the conversion of 1,2-dinitroparaffins produced by the nitration of straight chain alpha-olefins to high yields of their corresponding nitroolefins when the dinitroparaffins are in admixture with other nitrogen-containing derivatives of the alpha-olefins.

It is a further object of this invention to provide a method for the conversion of 1,2-dinitroparaffins and nitronitrites into high yields of their corresponding 1-nitroolefins and nitroalcohols.

Other objects of this invention will be apparent from the description and the claims that follow.

As used in this specification and appended claims, the term "nitronitrites" means compounds having the formula

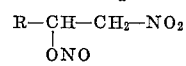

wherein R is a normal alkyl radical having from 1 to 22 carbon atoms; the term "dinitroparaffins" means compounds having the formula

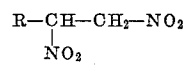

wherein R is a normal alkyl radical having from 1 to 22 carbon atoms; the term "nitroalcohols" means compounds having the formula

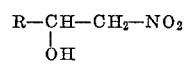

wherein R is a normal alkyl radical having from 1 to 22 carbon atoms; and the term "nitroolefins" means compounds having the formula R—CH=CH—$NO_2$, wherein R is a normal alkyl radical having from 1 to 22 carbon atoms.

In accordance with this invention a dinitroparaffin having the formula

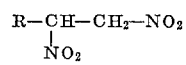

wherein R is a normal alkyl radical having from 1 to 22 carbon atoms and produced by the nitration of a straight chain alpha-olefin having from 3 to 24 carbon atoms and in admixture with a nitronitrite having the formula

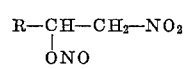

wherein R is a normal alkyl radical having from 1 to 22 carbon atoms and which is also produced during the nitration of the straight chain alpha-olefins, or in admixture with a nitroalcohol having the formula

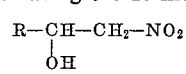

wherein R is a normal alkyl radical having from 1 to 22 carbon atoms and which is produced by the hydrolysis of the crude nitration mixture resulting from the nitration of an alpha-olefin having from 3 to 24 carbon atoms, is contacted with a base, the amount of the base being in the range of from 0.9 to 1.1 equivalent weights of base per mole of dinitroparaffin.

The bases which may be employed in the process of this invention are gaseous ammonia, aqueous ammonium hydroxide, aqueous solutions of the alkali metal hydroxides such as sodium hydroxide and potassium hydroxide, and aqueous slurries of the alkaline earth metal oxides.

The dinitroparaffins which are in admixture with the other nitrogen-containing derivatives of the alpha-olefins such as the nitronitrites or nitroalcohols are preferably contained in a paraffinic hydrocarbon solution, for example, in an isooctane (2,2,4-trimethylpentane) solution. The solution of the dinitroparaffin mixture is contacted with the base preferably at room temperatures although temperatures as high as the reflux temperature of the dinitroparaffin solution-base mixture may be utilized. Temperatures lower than room temperature also may be utilized, i.e., down to the freezing point of the solution or mixture. The reaction time will of course be longer for the lower temperatures. The critical feature of the invention is the utilization of from 0.9 to 1.1 equivalent weights of base per mole of dinitroparaffin in order to convert the dinitroparaffin to the corresponding nitroolefin at high yield and without degrading the nitrogen-containing compounds which are in admixture with the dinitroparaffn. If quantities in excess of about 1.1 equivalent weights of base per mole of dinitroparaffin are employed there will be considerable degradation of the dinitroparaffin to undesirable by-products of little or no value and in addition the nitrogen-containing derivatives of the alphaolefin with which the dinitroparaffin is admixed also will be degraded to useless by-products. If amounts less than about 0.9 equivalent weight of base per mole of dinitroparaffin are employed the yield of nitroolefin from the dinitroparaffin decreases to a degree such that the residual amount of dinitroparaffin in the product becomes a problem of separation and recovery. The concentration of the aqueous solution of base is not critical, from 0.1 gram to 25 grams per 100 ml. of solution have been found convenient, although higher and lower concentrations may be used with equally good results.

If the dinitroparaffin is in admixture with the nitronitrite (as produced by the nitration of the alphaolefin) the base is added to the mixture, preferably at room temperature and preferably in an amount which is one equivalent weight per mole of the dinitroparaffin. The mixture is stirred for from 1 to 15 minutes which is generally sufficient to convert the dinitroparaffin to the nitroolefin and thereafter, if necessary, additional water may be added to insure complete hydrolysis of the nitronitrite to the nitroalcohol. Preferably, after conversion of the dinitroparaffin to the nitroolefin the temperature of the mixture is raised to refluxing temperature (with water being added if necessary and if the original reaction temperature was at ambient temperatures or slightly higher) since at the higher temperatures the hydrolysis of the nitronitrite proceeds with much greater rapidity. After the hydrolysis reaction the mixture may be acidified by the addition of dilute hydrochloric acid, if necessary to neutralize any unreacted base. The aqueous layer is separated and thereafter the solvents such as isooctane and water are evaporated from the nitroolefin-nitroalcohol mixture. Although it is not a necessary part of this invention, a small quantity of an aliphatic alcohol having from 1 to 6 carbon atoms may be added to the nitroolefin-nitroalcohol mixture and heated for a short time to insure that there has been complete hydrolysis of the nitronitrite.

When the initial mixture consists of dinitroparaffin and nitroalcohol as produced by hydrolyzing the dinitroparaffin-nitronitrite mixture the approximately equivalent weight of base is added to the dinitroparaffin-nitroalcohol mixture at preferably ambient temperatures and the reaction is carried out by agitation for from 1 to about 15 minutes. Following the reaction time the mixture is acidified (if necessary to neutralize any unreacted base) with 10 percent aqueous hydrochloric acid. The aqueous layer is separated and the solvents, e.g., isooctane and water (if any remains) are evaporated from the nitroolefin-nitroalcohol mixture. The following examples are provided to illustrate certain specific embodiments of the invention and to demonstrate critical features of the invention.

*Example I*

In the first experiment, to 40 ml. of a 2,2,4-trimethylpentane solution containing 5.78 grams of 1,2-dinitrohexadecane and 1-nitro-2-hexadecanol nitrite (2.47 grams, 0.00782 mole of 1,2-dinitrohexadecane) was added 31.1 ml. of aqueous sodium hydroxide having a concentration of 1 gram per 100 ml. (0.0079 mole of sodium hydroxide). The mixture was stirred at ambient temperature for five minutes in a nitrogen stream. An additional 25 ml. of water was added and the mixture heated to refluxing conditions. The mixture was stirred at refluxing conditions for 30 minutes. The aqueous layer was separated, and the 2,2,4-trimethylpentane layer was evaporated under vacuum. In order to hydrolyze any small amounts of residual 1-nitro-2-hexadecanol nitrite, 25 ml. of methanol was added and the mixture heated for 10 minutes. The methanol was removed by evaporation under vacuum leaving 4.78 grams of product. Infrared analysis showed that the product contained 53.3 weight percent 1-nitrohexadecanol-2 and 35.3 weight percent 1-nitrohexadecene-1 for an overall yield of desirable products of 88.6 weight percent.

An identical experiment was carried out except that 27 ml. of the aqueous sodium hydroxide solution (0.00675 mole of sodium hydroxide) was employed. The product was recovered as described in the preceding experiment and it amounted to 4.86 grams which by infrared analysis was 54.8 weight percent 1-nitrohexadecanol-2 and 30.4 weight percent 1-nitrohexadecene-1, with unreacted 1,2-dinitrohexadecane in the product. The overall yield of desirable products was 85.2 weight percent. It will be noted that since the amount of base employed was less than 0.9 equivalent weight of sodium hydroxide per mole of dinitroparaffin the yield of nitroolefin was materially decreased. In the third experiment, 9 ml. of aqueous sodium hydroxide having a concentration of 10 gms. per 100 ml. (0.0225 mole of sodium hydroxide) was added to 50 ml. of a 2,2,4-trimethylpentane solution containing 5.66 grams of a mixture of 1,2-nitrohexadecane and 1-nitro-2-hexadecanol nitrite (2.42 grams, 0.00766 mole of 1,2-dinitrohexadecane). The mixture was stirred at ambient temperatures for about two minutes and thereafter it was acidified with dilute (10 percent) aqueous hydrochloric acid. The mixture was heated to refluxing temperatures and thereafter the aqueous layer was removed. The 2,2,4-trimethylpentane layer was filtered and the 2,2,4-trimethylpentane removed under vacuum. The product analyzed 20.4 weight percent 1-nitrohexadecanol-2 and 50.5 weight percent 1-nitrohexadecene-1. This experiment demonstrates that the combined yields of the desired nitroalcohol and nitroolefin are reduced markedly when excess base is employed.

*Example II*

An experiment identical to the first experiment of Example I was carried out except that 4.8 ml. of aqueous ammonia having a concentration of 2.9 gms. per 100 ml. (0.00825 mole $NH_3$) was added to the 1,2-dinitrohexadecane-containing mixture (0.00782 mole of 1,2-dinitrohexadecane). The reaction was carried out and the product was recovered as described in the first experiment of Example I. It was found upon analysis to amount to 5.0 grams and contain 54.4 weight percent 1-nitrohexadecanol-2 and 34.6 weight percent 1-nitrohexadecene-1 for an overall yield of desirable products of 89 weight percent.

Another experiment was carried out with 4.1 ml. of the aqueous ammonia solution instead of 4.8 ml., the remainder of the experiment being identical with that described above. The product (4.81 grams) analyzed 55.2 weight percent 1-nitrohexadecanol-2 and 27.6 weight percent 1-nitrohexadecene-1 for an overall yield of 82.8 weight percent of desirable products. It will be noted that since the quantity of ammonia employed was 0.0070 mole, whereas the amount of dinitroparaffin in the mixture was 0.00782, there was a decrease in the quantity of nitroolefin produced because of the insufficient amount of base. The analysis also showed that there was unconverted 1,2-dinitrohexadecane in the product.

A third experiment was carried out which was identical with the first two experiments described in this example except that the amount of ammonia employed was 0.0163 mole. The product (5.0 grams) analyzed 50.4 weight percent 1-nitrohexadecanol-2 and 29.1 weight percent 1-nitrohexadecene-1, thus showing that with an excess of the base there is a decrease in both of the desired products over that which is obtained when an approximately equivalent weight of base per mole of dinitroparaffin is employed.

*Example III*

A 2,2,4-trimethylpentane solution containing 10.5 grams of a mixture of 1-nitrohexadecanol-2 and 1,2-dinitrohexadecane per 100 ml. of solution (prepared by the hydrolysis of the nitration mixture resulting from the nitration of hexadecene-1) was fed into a glass-bead-packed reactor column at a rate of 25 ml. per minute along with ammonia gas at a rate of 0.068 gram per minute. The amount of 1,2-dinitrohexadecane which was introduced was 0.0039 mole per minute and the amount of ammonia introduced was 0.0040 mole per minute, i.e., an equivalent weight of base per mole of dinitroparaffin. The effluent was stripped with air, filtered and the solvent removed under vacuum. The yield of product was 9.7 grams which analyzed 54.1 weight percent 1-nitrohexadecanol-2 and 35.2 weight percent 1-nitrohexadecene-1. This was an overall yield of 89.3 weight percent showing the excellent results obtained utilizing an equivalent weight of base per mole of dinitroparaffin.

*Example IV*

A 2,2,4-trimethylpentane solution containing a mixture of 1-nitrohexadecanol-2 and 1,2-dinitrohexadecane produced by the hydrolysis of the nitration mixture resulting from the nitration of hexadecene-1 was fed into a 1-liter 3-necked flask equipped with a stirrer and with a stopcock at the bottom. The feed rate to the reactor was 10 ml. per minute, which was equivalent to 0.0015 mole of 1,2-dinitrohexadecane per minute. An aqueous ammonium hydroxide solution was also fed into the reactor simultaneously with the solution of nitrohexadecanol and dinitrohexadecane at the rate of 0.0015 equivalent weight of ammonia per minute. The reaction was carried out at ambient temperatures and the holdup time in the reactor was approximately four minutes. The effluent was heated to break the emulsion by passing it through a steam-jacketed, glass-bead-packed column. The organic layer was filtered and stripped of solvent under vacuum. The run was continued for a total of 6.5 hours and a 188.6 gram sample obtained after equilibrium conditions had been established analyzed 56.7 weight percent 1-nitrohexadecanol-2 and 33.8 weight percent 1-nitrohexadecene-1 for an overall yield of 90.5 weight percent. This run demonstrates that equivalent weight of base per mole of dinitroparaffin can be employed in a continuous reaction to give an excellent yield of product.

*Example V*

To 500 ml. of a 2,2,4-trimethylpentane solution containing 50 gms. of 1-nitrohexadecanol-2 and 1,2-dinitrohexadecane produced by the hydrolysis of the nitration mixture resulting from the nitration of hexadecene-1 was added 100 ml. of water and the mixture stirred at 26° C. This mixture contained 0.073 mole of 1,2-dinitrohexadecane. To this solution was added 43 grams of a 2.92 percent aqueous ammonia solution (0.074 mole ammonia. The reaction mixture was stirred for 30 minutes. Following the reaction period the mixture was filtered and the solvents were stripped from the product under vacuum. There was obtained 46.4 grams of product analyzing 56.3 weight percent 1-nitrohexadecanol-2 and 36.8 weight percent 1-nitrohexadecene-1 for an overall yield of 93.1 weight percent. This example also demonstrates the excellent yields which may be obtained by using an equivalent weight of base per mole of dinitroparaffin.

*Example VI*

To a 1000 ml. solution of 2,2,4-trimethylpentane containing 100 grams of a mixture of 1-nitrohexadecanol-2 and 1,2-dinitrohexadecane was added 750 ml. of water and the mixture stirred at ambient temperatures. The mixture contained 0.145 mole of 1,2-dinitrohexadecane. To the stirred mixture was added 308 ml. of an aqueous sodium hydroxide solution containing 5.8 grams sodium hydroxide (0.145 mole) and the mixture was stirred for 10 minutes. A total of 27 grams of a 3.76 weight percent aqueous hydrochloric acid solution was added in two portions and after a total time of 18 minutes after the initial addition of hydrochloric acid the mixture was refluxed for 25 minutes while being stripped with air. The organic layer was separated, water-washed, filtered and stripped of solvent under vacuum. The product (89 grams) recovered analyzed 56.8 weight percent 1-nitrohexadecanol-2 and 32.8 weight percent 1-nitrohexadecene-1 for an overall yield of 89.6 weight percent of desired products.

*Example VII*

In a first experiment 14 ml. of a 10 gram per 100 ml. aqueous solution of sodium hydroxide (0.035 mole) was added to 200 ml. of a 2,2,4-trimethylpentane solution containing 0.036 mole of 1-nitrohexanedecanol-2 and 0.030 mole of 1,2-dinitrohexadecane. The mixture was stirred at room temperature for 10 minutes and a small sample was recovered and analyzed. It contained 51.8 weight percent 1-nitrohexadecanol-2 and 29.7 weight percent 1-nitrohexadecene-1. After an additional 20 minutes of stirring the product showed a very marked drop in the 1-nitrohexadecene-1 concentration. This experiment demonstrates that excess base gives markedly lower yields of desirable products.

In a second experiment in comparison with the first experiment of this example, when an exactly equivalent weight of sodium hydroxide per mole of 1,2-dinitrohexadecane was employed, after 30 minutes of reaction time the product analyzed 56.7 weight percent 1-nitrohexadecanol-2 and 33.2 weight percent 1-nitrohexadecene-1. After 1 hour the product still contained 55.4 weight percent 1-nitrohexadecanol-2 and 32.5 weight percent 1-nitrohexadecene-1. This experiment shows that when equivalent weights of base are employed per mole of dinitroparaffin the product is not degraded except to a small degree when excessive reaction times are employed.

*Example VIII*

An experiment was carried out wherein 100 ml. of a solution of 2,2,4-trimethylpentane containing 10 grams of a hydrolyzed nitration product (1-nitrohexadecanol-2 and 1,2-dinitrohexadecane, the 1,2-dinitrohexadecane amounting to 4.65 grams or 0.0147 mole) was added to a slurry of 0.41 grams (0.00735 mole, or 0.0147 equivalent weight) of calcium oxide in 40 ml. of water. After stirring at ambient temperature for 30 minutes 50 ml. of diethyl ether was added, the mixture acidified with 10 percent aqueous hydrochloric acid, and the ether layer washed with water. The diethyl ether and the 2,2,4-trimethylpentane were evaporated under vacuum and 25 ml. of methanol was added to the solution and the solution heated for 10 minutes. After removal of the methanol under vacuum the product analyzed 56.7 weight percent 1-nitrohexadecanol-2 and 31.3 weight percent 1-nitrohexadecene-1. This is an overall yield of 88 weight percent demonstrating that excellent yields can be obtained when one equivalent weight of base per mole of dinitroparaffin is used.

Example IX

A slurry of 1 gram of calcium oxide (0.0176 moles, 0.0352 equivalent weight) 40 grams water, 10 grams 2,2,4-trimethylpentane and 3 grams of a mixture of 1-nitrooctanol-2 and 1,2-dinitrooctane (0.0067 mole of 1,2-dinitrooctane) was stirred at room temperature for 10 minutes. After acidification with 10 percent aqueous hydrochloric acid, diethyl ether extraction and solvent stripping under vacuum, the product obtained analyzed 38.4 weight percent 1-nitrooctanol-2 and 33.0 weight percent 1-nitrooctene-1. This example demonstrates that an excess of base markedly decreases the yield of desirable products which can be obtained. A similar experiment was carried out except that pure 1,2-dinitrooctane was employed and a yield of 97 weight percent of nitroolefin was obtained using the calcium oxide slurry. This demonstrates that when the dinitroparaffin is not in admixture with another nitrogen-containing derivative an excess of base may be utilized without loss of desired product. A third experiment was carried out utilizing a pure 1-nitrooctanol-2 (1.5 grams). A product amounting to 1.3 grams was obtained which analyzed 71 weight percent 1-nitrooctanol-2 and 18.5 weight percent 1-nitrooctene-1. This example shows that whereas some conversion of nitroalcohol to nitroolefin can occur the yield is very poor and there is a considerable loss to products which are undersirable.

Example X

A slurry of 1 gram of magnesium oxide (0.0248 mole, 0.0496 equivalent weight) 40 grams of water, 10 grams of 2,2,4-trimethylpentane and 3 grams of a hydrolyzed nitration product containing 52.3 weight percent 1-nitrooctanol-2 and 45.7 weight percent 1,2-dinitrooctane (0.0067 mole) was stirred at room temperature for 25 minutes. Diethyl ether was added, the mixture acidified with aqueous 10 percent hydrochloric acid, the diethyl ether layer filtered and the solvents removed under vacuum. There was obtained 2.55 grams of product analyzing 54.5 weight percent of 1-nitrooctanol-2 and 35.9 weight percent 1-nitrooctene-1. Although there was an apparent excess of magnesium oxide employed it was found that because of the exceedingly low solubility of magnesium oxide in water that the amount which dissolved was sufficient to convert the dinitroparaffin and therefore the slurry reacted as though an equivalent weight of magnesium oxide were present.

Similar experiments with barium hydroxide demonstrated that it reacted in the same manner as CaO and MgO.

Example XI

An experiment was carried out similar to that of Example X except that 1 gram of zinc oxide was utilized instead of 1 gram of magnesium oxide. No nitroolefin was formed after 15 minutes of reaction time, apparently because the zinc oxide has too low a solubility in water.

The foregoing examples demonstrate that various bases may be utilized to convert 1,2-dinitroparaffins into their corresponding 1-nitroolefins by the use of an equivalent weight of the base.

The nitroolefins prepared in accordance with this invention are useful both as chemical intermediates and in the production of other useful products by well-known methods. For example they may be used in the production of polymeric materials and they may be converted into useful detergents by reaction with sodium bisulfite. The nitroalcohols which are produced simultaneously with the nitroolefins when the crude nitration mixture of dinitroparaffins and nitronitrites is converted in accordance with this invention also are useful both as chemical intermediates and in the production of other useful products, for example, nitroalcohols may be sulfated to produce anionic detergents or they may be condensed with an alkylene oxide to produce a non-ionic detergent. Nitroalcohols also may be utilized as solvents and plasticizers, particularly for nitrocellulose.

We claim:
1. A method for the conversion of dinitroparaffins having the formula

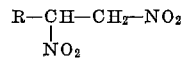

wherein R is a straight chain alkyl radical having from 1 to 22 carbon atoms to their corresponding nitroolefins, said dinitroparaffin being admixed with a nitrogen-containing derivative of a straight chain alpha-olefin said derivative being selected from the group consisting of nitronitrites having the formula

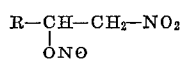

wherein R is a straight chain alkyl radical having from 1 to 22 carbon atoms and nitroalcohols having the formula

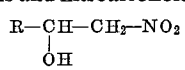

wherein R is a straight chain alkyl radical having from 1 to 22 carbon atoms, which comprises contacting said dinitroparaffin-containing mixture with from 0.9 to 1.1 equivalent weights of base per mole of said dinitroparaffin and thereafter recovering the nitroolefin.

2. The method according to claim 1 wherein the base is gaseous ammonia.

3. The method according to claim 1 wherein the base is aqueous ammonium hydroxide.

4. The method according to claim 1 wherein the base is aqueous sodium hydroxide.

5. The method according to claim 1 wherein the base is an aqueous slurry of calcium oxide.

6. The method according to claim 1 wherein the base is an aqueous slurry of magnesium oxide.

7. The method according to claim 1 wherein the dinitroparaffin is 1,2-dinitrooctane, the nitronitrite is 1-nitro-2-octanolnitrite and the nitroalcohol is 1-nitro-2-octanol.

8. The method according to claim 1 wherein the dinitroparaffin is 1,2-dinitrohexadecane, the nitronitrite is 1-nitro-2-hexadecanolnitrite and the nitroalcohol is 1-nitro-2-hexadecanol.

9. A method for the conversion of dinitroparaffins having the formula

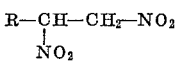

and nitronitrites having the formula

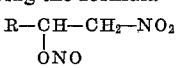

wherein R is a straight chain alkyl radical having from 1 to 22 carbon atoms to produce respectively the corresponding nitroolefin from the dinitroparaffin and the corresponding nitroalcohol from the nitronitrite which comprises contacting said dinitroparaffin-nitronitrite-containing mixture with from 0.9 to 1.1 equivalent weights of base in aqueous solution per mole of said dinitroparaffin and thereafter recovering the nitroolefin and nitroalcohol.

10. The method according to claim 9 wherein the base is aqueous ammonium hydroxide.

11. The method according to claim 9 wherein the base is aqueous sodium hydroxide.

12. The method according to claim 9 wherein the base is an aqueous slurry of calcium oxide.

13. The method according to claim 9 wherein the base is an aqueous slurry of magnesium oxide.

14. The method according to claim 9 wherein the dinitroplaraffin is 1,2-dinitrooctane and the nitronitrite is 1-nitro-2-octanolnitrite.

15. The method according to claim 9 wherein the dinitroparaffin is 1,2-dinitrohexadecane and the nitronitrite is 1-nitro-2-hexadecanolnitrite.

No reference cited.

CARL D. QUARFORTH, *Primary Examiner.*

UNITED STATES PATENT OFFICE
CERTIFICATE OF CORRECTION

Patent No. 3,192,271　　　　　　　　　　　　　　　　June 29, 1965

Giovanni A. Bonetti et al.

It is hereby certified that error appears in the above numbered patent requiring correction and that the said Letters Patent should read as corrected below.

Column 3, line 17, for "dinitroparaffn" read -- dinitroparaffin --; lines 22 and 35, for "alphaolefin", each occurrence, read -- alpha-olefin --; column 4, line 15, for "nitrate" read -- nitrite --; line 40, for "1,2-nitrohexadecane" read -- 1,2-dinitrohexadecane --; column 5, line 72, after "ammonia" insert a closing parenthesis; column 6, line 33, for "1-nitrohexanedecanol-2" read -- 1-nitrohexadecanol-2 --; column 8, line 68, for "nitroplaraffin" read -- nitroparaffin --.

Signed and sealed this 16th day of November 1965.

(SEAL)
Attest:

ERNEST W. SWIDER　　　　　　　　　　　　　　　EDWARD J. BRENNER
Attesting Officer　　　　　　　　　　　　　　　　Commissioner of Patents

UNITED STATES PATENT OFFICE
CERTIFICATE OF CORRECTION

Patent No. 3,192,271　　　　　　　　　　　　　　　　　　June 29, 1965

Giovanni A. Bonetti et al.

It is hereby certified that error appears in the above numbered patent requiring correction and that the said Letters Patent should read as corrected below.

Column 3, line 17, for "dinitroparaffn" read -- dinitroparaffin --; lines 22 and 35, for "alphaolefin", each occurrence, read -- alpha-olefin --; column 4, line 15, for "nitrate" read -- nitrite --; line 40, for "1,2-nitrohexadecane" read -- 1,2-dinitrohexadecane --; column 5, line 72, after "ammonia" insert a closing parenthesis; column 6, line 33, for "1-nitrohexanedecanol-2" read -- 1-nitrohexadecanol-2 --; column 8, line 68, for "nitroplaraffin" read -- nitroparaffin --.

Signed and sealed this 16th day of November 1965.

(SEAL)
Attest:

ERNEST W. SWIDER　　　　　　　　　　　　　　　　　　EDWARD J. BRENNER
Attesting Officer　　　　　　　　　　　　　　　　　　Commissioner of Patents